(12) United States Patent
Lo et al.

(10) Patent No.: US 8,347,690 B2
(45) Date of Patent: Jan. 8, 2013

(54) LEAKAGE DETECTOR FOR COMPRESSORS

(75) Inventors: Chi-Hung Lo, Lujhu Township (TW); Mau-Jia Chen, Lujhu Township (TW)

(73) Assignee: Heng Sheng Precision Tech. Co., Ltd., Lujhu Township (TW)

( * ) Notice: Subject to any disclaimer, the term of this patent is extended or adjusted under 35 U.S.C. 154(b) by 297 days.

(21) Appl. No.: 12/938,339

(22) Filed: Nov. 2, 2010

(65) Prior Publication Data

US 2012/0103070 A1    May 3, 2012

(51) Int. Cl.
*G01M 3/04* (2006.01)
(52) U.S. Cl. ............................................. 73/45.5; 73/40
(58) Field of Classification Search ......... 73/40, 40.5 R, 73/45.5, 45.8, 49.3, 49.7
See application file for complete search history.

(56) References Cited

U.S. PATENT DOCUMENTS

| | | | |
|---|---|---|---|
| 8,074,492 B2* | 12/2011 | Brockmann | 73/40.7 |
| 2005/0056081 A1* | 3/2005 | Gocho | 73/40 |
| 2006/0196250 A1* | 9/2006 | Gocho | 73/40 |

* cited by examiner

*Primary Examiner* — Hezron E Williams
*Assistant Examiner* — David Z Huang
(74) *Attorney, Agent, or Firm* — Wang Law Firm, Inc.; Li K. Wang; Stephen Hsu

(57) ABSTRACT

A compressor leakage detector includes a water tank, an elevator platform, a control panel, and a pressure testing unit. The elevator platform is disposed in the water tank to rise and drop vertically. The operating panel of the control panel has a human-machine interface, indicators, and pressure gauges. The pressure testing unit in the control panel uses an intake pipe to connect to several branch pipes that in turn connect to the compressors in the water tank. Each of the branch pipes connects in series to at least one intake EM valve and at least one exhaust EM valve. A pressure sensor is interposed between the intake EM valve and the corresponding compressor.

8 Claims, 5 Drawing Sheets

LEAKAGE DETECTOR FOR COMPRESSORS

BACKGROUND OF THE INVENTION

1. Field of Invention

The invention relates to a leakage detector and, in particular, to a device that measures the sealing property of a compressor after its assembly.

2. Related Art

As shown in FIG. 5, a conventional leakage detector for compressors includes a water tank 8. Ten vehicle air conditioning compressors 9 are disposed at the bottom of the water tank 8. Each of the compressors 9 is pressurized. The water tank 8 is then filled with water to test the compressors 9. The water tank 8 has an observing window 80. After the compressors 9 are under the pressure in the water tank 8, one can observe the sealing property of them via the observing window 80. If the sealing of a compressor 9 is not good, bubbles are likely produced. This determines whether each of the compressors 9 in the water tank 8 passes the leakage test.

However, the above-mentioned compressor leakage detector has the following problems:

1. Even though the water tank 8 has sufficient space to accommodate several compressors 9 at a time and the compressors 8 are tested at the same time, the tester simply uses naked eyes to observe whether any bubble is produced. If the bubbles from a compressor 9 are not obvious and not continuously produced, the tester may not be able to detect them. This can be a blind spot in the quality check of compressors 9.

2. If the bubbles produced due to air leakage from a compressor 9 are so tiny that the tester cannot identify them by naked eyes, such compressors 9 are likely considered as good. This is another blind spot.

3. When the tester observes the compressors 9 via the observing window 80, the observing window 80 is likely to become foggy. Besides, watermarks and dirty residues also influence observations.

4. The compressors 9 are pumped with pressurized gas before being put into the water tank 8. If a compressor 9 is not completely locked, it may explode during the pressuring process. In this case, its parts would fly all over the place to hurt people and damage other objects. It is thus potentially dangerous.

The conventional compressor leakage detector requires human observations. It is not only time-consuming, but also lacks accuracy. This renders leakage tests of compressors 9 very inefficient. It also has the potential danger that parts of the compressor may explode after it is pressurized.

SUMMARY OF THE INVENTION

An objective of the invention is to provide a compressor leakage detector that can quickly detect any pressure leakage in the compressor. It can detect even very tiny leakage. The entire testing process is quick and accurate, rendering higher quality check efficiency.

Another objective of the invention is to automatically record the number of compressors being tested, the number of good products, and the number of bad products. Such information can be used for quality statistics.

To achieve the above-mentioned objectives, the invention includes: a water tank, an elevator platform, a control panel, and a pressure testing unit.

The top end of the water tank has an opening with a cover.

The elevator platform is disposed in the water tank and driven by a driving mechanism to rise or drop vertically. The elevator platform can hold several compressors to be tested and drop into water.

The control panel is disposed by the water tank. It has an operating panel with a human-machine interface. There are at least one indicator and at least one pressure gauge for each of the compressors being tested. The control panel has a programmable controller connected with the human-machine interface. One can set the number of compressors to be tested, a testing pressure, and a test time through the human-machine interface.

The pressure testing unit is inside the control panel. It has an intake pipe that connects to several branch pipes in order to connect to the compressors in the water tank. Each of the branch pipes has at least one intake electromagnetic (EM) valve and at least one exhaust EM valve. A pressure sensor is interposed between the intake EM valve and compressor.

After the compressors to be tested are disposed on the elevator platform and connected with the branch pipes, they are dropped into water. When testing leakage, one closes the opening with the cover and starts to pressurize the compressors. The pressure gauge indicates the pressure change inside each of the compressors. After the testing time is over, the indicators show the results and the exhaust EM valve release the pressure.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

Figure 1:
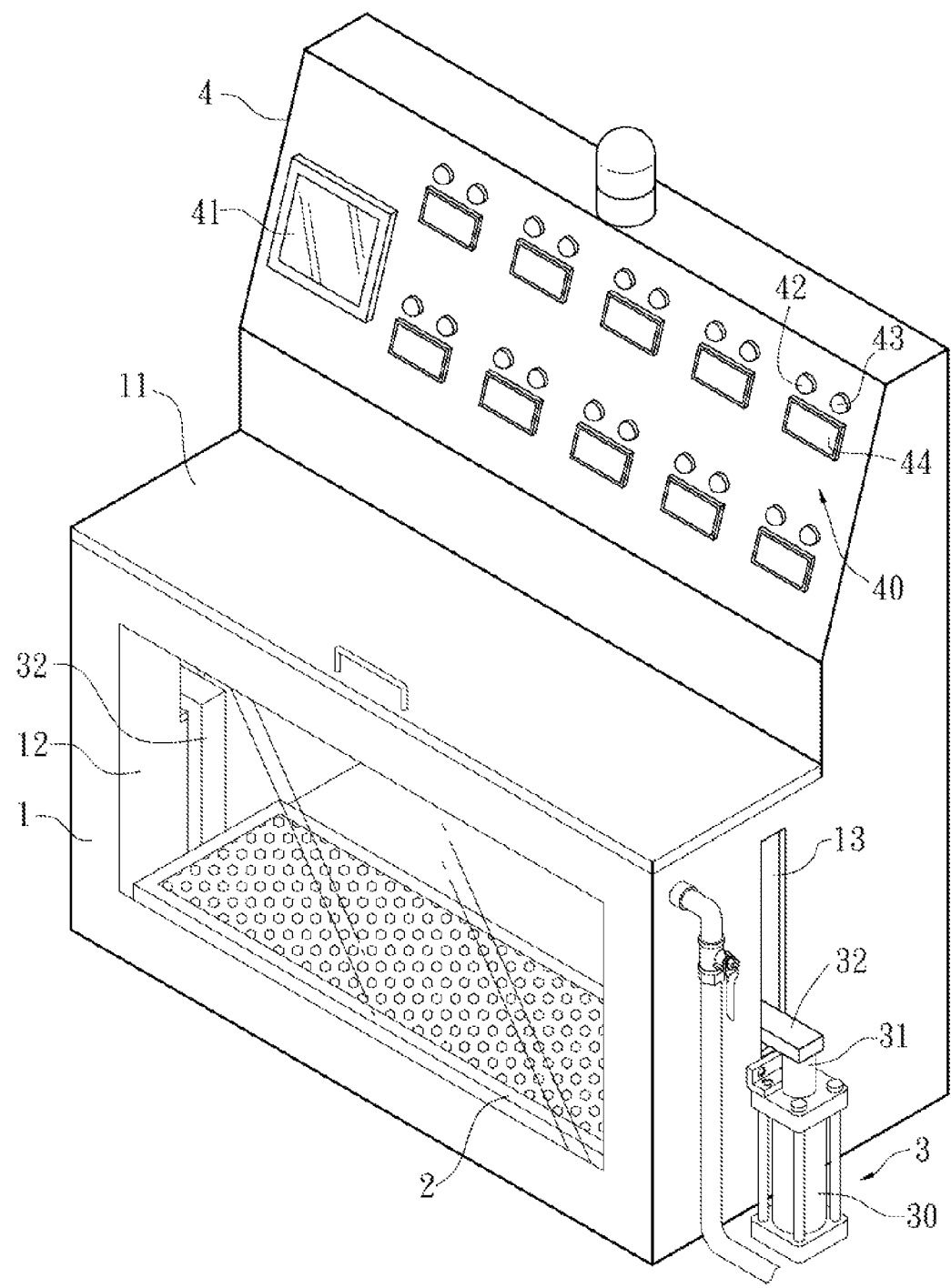
FIG. 1 is a three-dimensional perspective view of the invention.

The present invention will be apparent from the following detailed description, which proceeds with reference to the accompanying drawings, wherein the same references relate to the same elements.

Please refer to FIGS. 1 to 4 for a preferred embodiment of the invention. In this embodiment, the compressor leakage detector includes a water tank 1, an elevator platform 2, a driving mechanism 3, a control panel 4, and a pressure testing unit 5.

Figure 2:
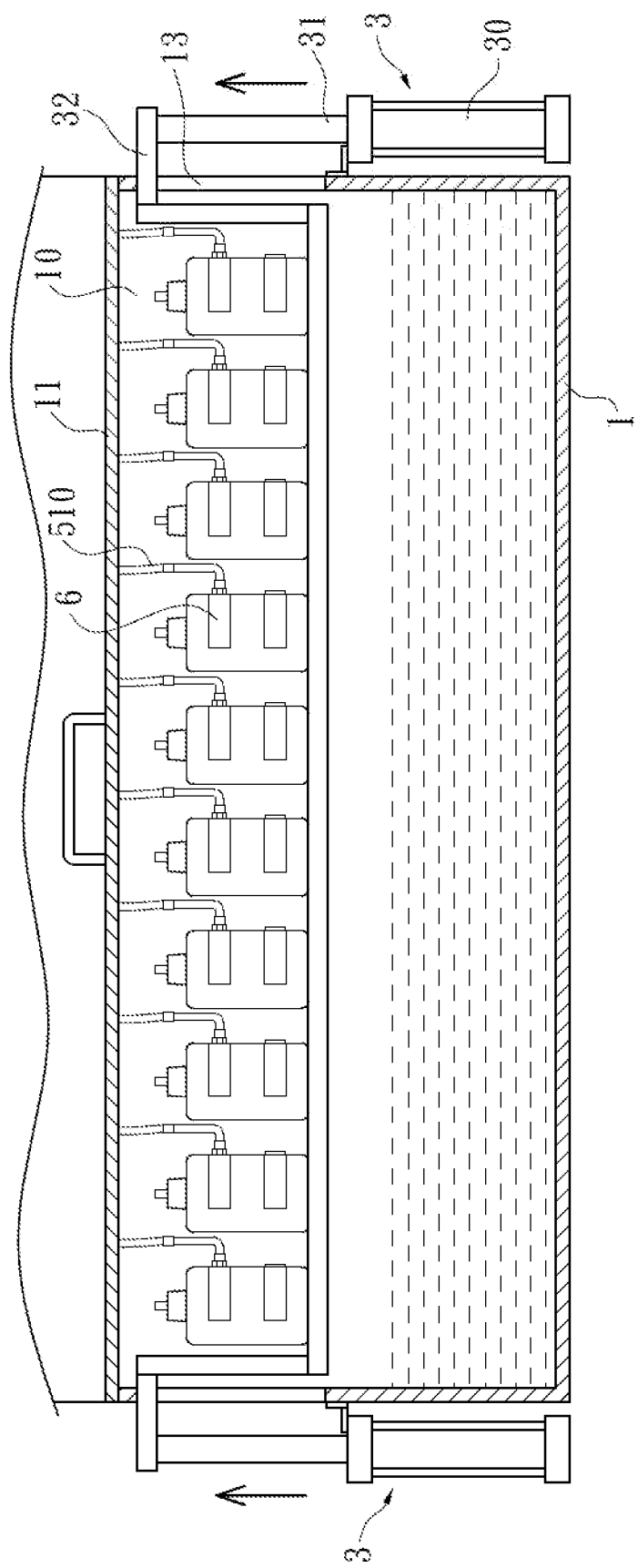
FIG. 2 is a schematic view showing that the elevator platform rises for the disposition of compressors according to the invention.

As shown in FIGS. 1 and 2, the water tank 1 can accommodate up to 10 compressors 6 to be tested. The top end of the water tank 1 has an opening 10 with a cover 11. During leakage test, the water tank 1 is filled with water and imposed with a pressure. As shown in FIG. 1, the front side of the water tank 1 has an observing window 12 for the user to observe various compressors 2 in the water. The opening 10 of the water tank 1 has a safety switch (not shown). The safety switch is triggered when the cover 11 covers the opening 10 of the water tank 1, and then the compressors 6 are pressurized.

This ensures that the cover 11 has sealed the opening 10 before the compressors 6 are pressurized.

As shown in FIGS. 1 and 2, the elevator platform 2 is disposed in the water tank 1. The driving mechanism 3 drives it to rise or drop. Ten compressors 6 to be tested are disposed on the elevator platform 2 when the elevator platform 2 are out of the water. For the leakage test, the driving mechanism 3 drives the elevator platform 2 to sink into water. In this embodiment, both sides of the water tank 1 have a longitudinal long opening 13, respectively. The driving mechanism 3 is fixed on both sides of the water tank 1 by two pressure tanks 30, respectively. Each of the pressure tanks 30 has a rod 31 that is driven to extend or retract. A bar 32 is connected to the end of each rod 31. The bars 32 extend through the long openings 13 and connect to both sides of the elevator platform 2 in the water tank 1. The extension and retraction of the rods 31 of the pressure tanks 30 drive the elevator platform 2 to rise and fall in the water tank 1.

As shown in FIG. 1, the control panel 4 is disposed by the water tank 1. The control panel 4 has an operating panel 40 with a human-machine interface 41. There are two indicators 42, 43 and a pressure gauge 44 for each of the compressors 6 to be tested. The control panel 4 has a programmable controller (not shown). The two indicators 42, 43 and the pressure gauge 44 are electrically connected with the programmable controller. The programmable controller is connected with the human-machine interface 41. The routine in the programmable controller controls the signal transmissions of the indicators 42, 43 and the pressure gauge 44. The human-machine interface 41 sets the number of compressors 6 to test, a testing pressure, and a testing time. In this embodiment, the indicator 42 lights up when the corresponding compressor 6 passes the test. Otherwise, the other indicator 43 lights up.

Figure 3:
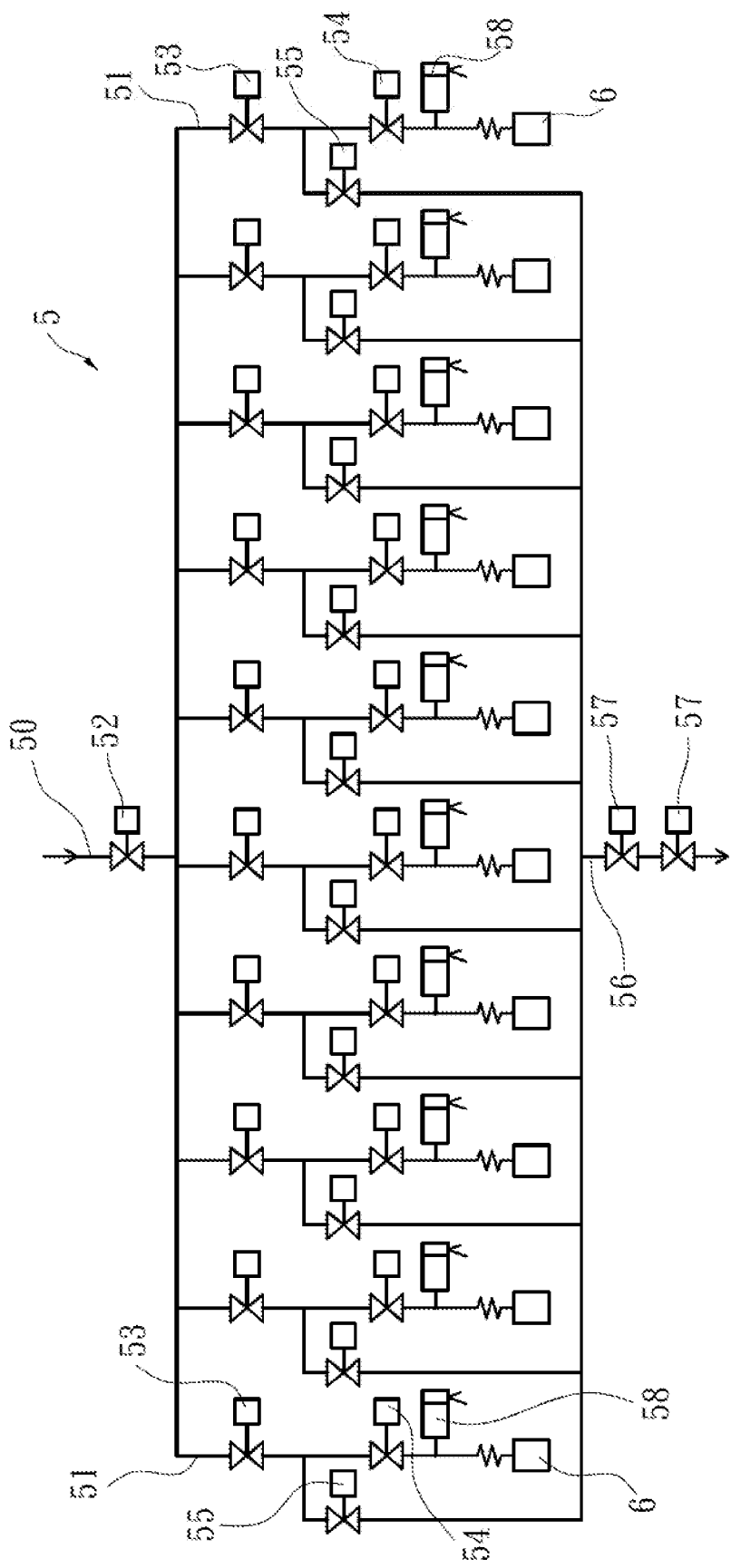
FIG. 3 is a schematic view of the circuit in the pressure testing unit.

As shown in FIG. 3, the pressure testing unit 5 is disposed in the control panel 4. In this embodiment, the pressure testing unit uses nitrogen to test the leakage of the compressors 6. The pressure testing unit 5 uses an intake pipe 50 to connect with several branch pipes 51 that in turn connect to the compressors 6 in the water tank 1. A main intake electromagnetic (EM) valve 52 is interconnected between the intake pipe 50 and the branch pipes 51. Each of the branch pipes 51 connects in series two intake EM valves 53, 54 and an exhaust EM valve 55, with the exhaust EM valve 55 interconnected between the two intake EM valves 53, 54. Each of the exhaust EM valves 55 connects to an exhaust pipe 56. The exhaust pipes 56 are connected with two main exhaust EM valves 57 to release the gas to the atmosphere. A pressure sensor 58 is interposed between the intake EM valve 54 and the compressor 6. In this embodiment, each of the branch pipes 51 connects to the corresponding compressor 6 in the water tank 1 via a pressurized hose 510. The main intake EM valve 52, the two intake EM valves 53, 54, the exhaust EM valve 55, the main exhaust EM valve 57, the pressure sensor 58 are electrically connected with the programmable controller, which sends signals to control the on and off of all the components.

In this embodiment, one uses the human-machine interface 41 to set the number of compressors to test as 10, the testing pressure as 19 bars, the testing time as 2 minutes before testing the leakage of compressors.

Figure 4:
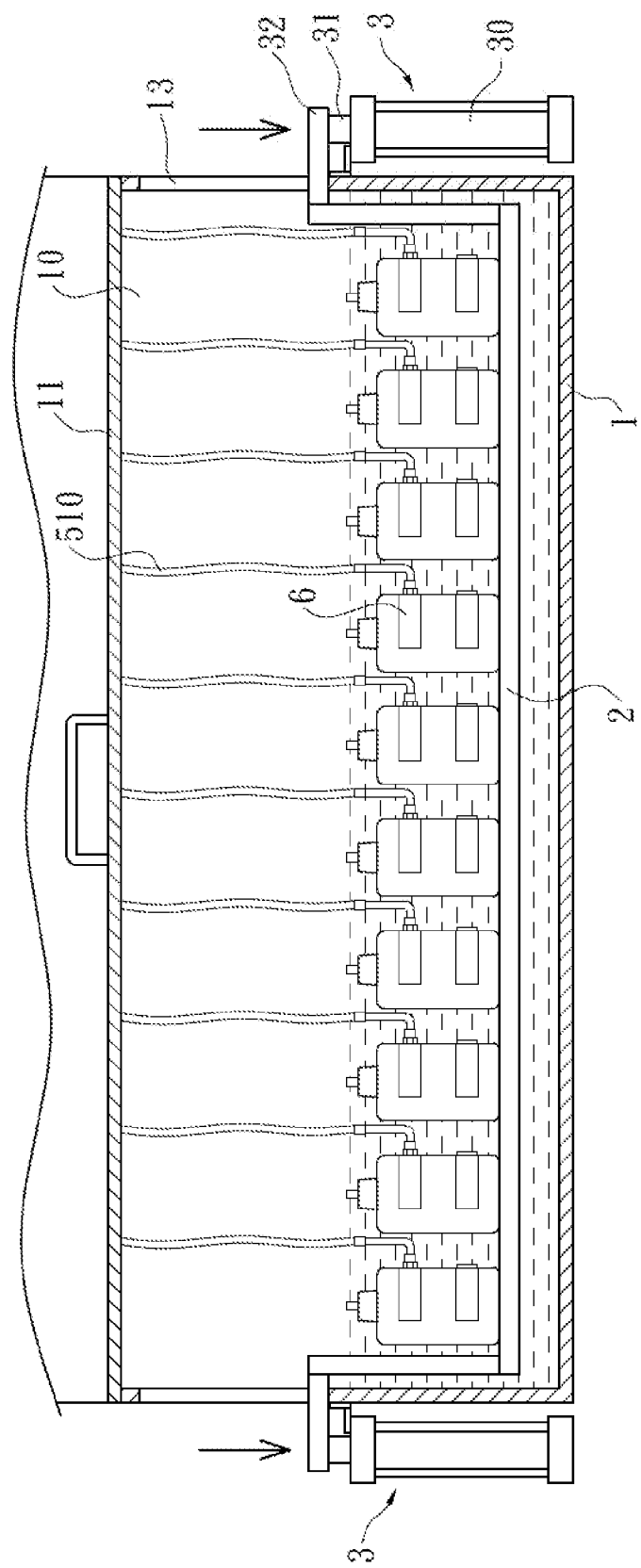
FIG. 4 is a schematic view showing that the elevator platform drops into water.
Figure 5:
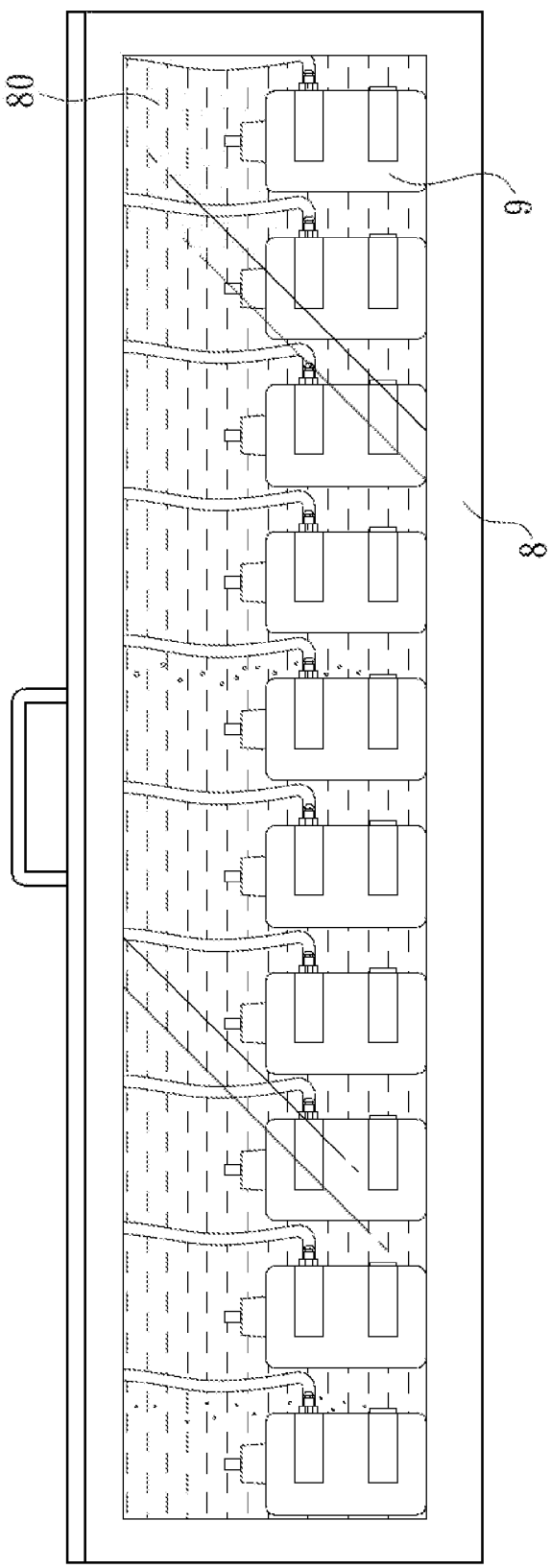
FIG. 5 is a schematic view of using a conventional compressor leakage detector to test leakage.

After setting the parameters through the human-machine interface 41, the elevator platform 2 is raised from the water tank 1 as shown in FIG. 2. After each of the compressors 6 is connected with the corresponding pressurized hose 510, the elevator platform 2 is dropped into the water as shown in FIG. 4. Before testing, the cover 11 closes the opening 10. Afterwards, the compressors 6 are pressurized. During this process, the pressure has to exceed the testing pressure set by the user. In this embodiment, the pressure is 21 bars. Afterwards, the main intake EM valve 52 and the intake EM valves 53, 54 are opened for nitrogen to enter the compressors 6.

During the pressurizing process, the internal pressure of compressors 6 is measured by the pressure sensor 58. The pressure gauge 44 shows the internal pressure thereof in digits. After the testing time of two minutes is over, the indicator 42 lights up to show the corresponding compressor 6 passes the test, meaning that the sealing property thereof is good. Otherwise, the indicator 43 lights up, meaning that the sealing property of the compressor 6 is bad. The two indicators 42, 43 thus show the test result. Each leakage test result is recorded and shown via the human-machine interface 40. Such information includes the testing date, the number of compressors 6 being tested, the number of compressors 6 that pass the test, and the number of compressor 6 that do not pass the test.

After each test is finished, the intake EM valves 53, 54 associated with each compressor 6 are closed. The exhaust EM valve 55 and the two main exhaust EM valves 57 are opened so that the pressure inside the compressors 6 is released to the atmosphere.

According to the above description, it is apparent that the invention has the following advantages:

1. When testing the leakage of compressors 6, the invention uses the pressure sensor 58 instead of user's naked eyes. Moreover, the test result is shown by the indicators 42, 43. The user thus only needs to pay attention to the two indicators 42, 43 in order to learn the test result. Even a tiny leakage of a compressor 6 can be detected by the pressure sensor 58. The leakage test result can thus be quickly obtained via signal transmissions. This method is more efficient and accurate than conventional compressor leakage detectors.

2. This embodiment still has the observing window 12. The observing window 12 only serves the purpose of observing serious leakage from the compressors 6 in the water tank 1 and the process of testing in general. Whether the observing window 12 is completely transparent and clear is irrelevant to the test result.

3. The compressors 6 are pressurized after the elevator platform sinks into water. If any part of a compressor 6 is not completely fixed and is burst out during the pressuring process, it would be moderated by water not to break the water tank 1. It is thus safer than conventional compressor leakage detectors.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A compressor leakage detector, comprising:
a water tank, whose top has an opening with a cover;
an elevator platform disposed in the water tank and driven by a driving mechanism to rise and drop vertically, the elevator platform having the ability to hold a plurality of compressors to test and to sink into the water in the tank;
a control panel disposed by the water tank and having an operating panel;
wherein the operating panel has a human-machine interface and at least one indicator and at least one pressure gauge for each of the compressors, the control panel has a programmable controller connected with the human-machine interface, and the human-machine interface is used to set parameters of the number of compressors to test, a testing pressure, and a testing time; and a pressure testing unit disposed in the control panel and using an intake pipe to connect a plurality of branch pipes that connect to the compressors in the water tank; wherein each of the branch pipes connects in series at least one intake electromagnetic (EM) valve and at least one exhaust EM valve, and a pressure sensor is interposed between the intake EM valve and the compressor; wherein the compressors on the elevator platform connect to the corresponding branch pipes and sink into the water in the tank, the compressors are pressurized to the testing pressure after the cover covers the opening, the at least one pressure gauge shows the internal pressure of each of the corresponding compressors, the indicators show test results after the testing time is over, and the exhaust EM valve releases the pressure of each of the compressors.

2. The compressor leakage detector of claim 1, wherein one side of the water tank has at least one observing window for observing general conditions of the compressors in the water tank.

3. The compressor leakage detector of claim 1, wherein both sides of the water tank have a longitudinal opening, a driving mechanism is fixed on both sides of the water tank by two pressure tanks, each of the pressure tanks having a rod driven to extend or retract, a bar is connected to the end of each rod, the two bars extend through the longitudinal openings to connect to both sides of the elevator platform, and the extension and retraction of the rods of the pressure tanks drive the elevator platform to rise and drop in the water tank.

4. The compressor leakage detector of claim 1, wherein the intake pipe is connected in series with a main intake EM valve.

5. The compressor leakage detector of claim 1, wherein each of the branch pipes is connected in series with two intake EM valves and the exhaust EM valve is interposed between the two intake EM valves.

6. The compressor leakage detector of claim 1, wherein all of the exhaust EM valves are connected to a corresponding exhaust pipe, and each of the exhaust pipes is connected with two main exhaust EM valves for releasing pressure.

7. The compressor leakage detector of claim 1, wherein the opening of the water tank has a safety switch that is triggered when the cover covers the opening of the water tank, ensuring that the opening is closed before the compressors are pressurized.

8. The compressor leakage detector of claim 1, wherein the operating panel has two indicators, one of which lights up to show that the corresponding compressor passes the leakage test whereas the other lights up to show that the corresponding compressor does not pass the leakage test.

* * * * *